United States Patent
Harita (10) Patent No.: US 8,069,527 B2
(45) Date of Patent: Dec. 6, 2011

(54) WIPER BLADE AND VEHICLE WIPER

(75) Inventor: Yasuhiro Harita, Shizuoka-ken (JP)

(73) Assignee: ASMO Co., Ltd., Shizuoka-ken (JP)

( * ) Notice: Subject to any disclaimer, the term of this patent is extended or adjusted under 35 U.S.C. 154(b) by 1029 days.

(21) Appl. No.: 11/953,790

(22) Filed: Dec. 10, 2007

(65) Prior Publication Data

US 2008/0155776 A1    Jul. 3, 2008

(30) Foreign Application Priority Data

Dec. 27, 2006   (JP) ................. 2006-351781

(51) Int. Cl.
    *B60S 1/52* (2006.01)
(52) U.S. Cl. ............... 15/250.04; 15/250.02; 239/284.1; 239/543
(58) Field of Classification Search ............. 15/250.351, 15/250.361, 250.01, 250.04, 250.02; 239/284.1, 239/284.2, 543–545
See application file for complete search history.

(56) References Cited

U.S. PATENT DOCUMENTS

| | | | | |
|---|---|---|---|---|
| 5,074,471 A | * | 12/1991 | Baumgarten et al. | 239/284.1 |
| 5,819,360 A | * | 10/1998 | Fujii | 15/250.04 |
| 6,442,788 B1 | * | 9/2002 | Fleischer | 15/250.04 |
| 6,463,621 B1 | * | 10/2002 | Zimmer et al. | 15/250.04 |
| 6,836,924 B2 | | 1/2005 | Egan-Walter | |
| 7,152,808 B2 | * | 12/2006 | Jenkins | 239/1 |
| 2002/0000481 A1 | * | 1/2002 | Utz et al. | 239/284.1 |
| 2007/0089257 A1 | | 4/2007 | Harita et al. | |

FOREIGN PATENT DOCUMENTS

| | | |
|---|---|---|
| JP | 54-180541 U | 12/1979 |
| JP | 61-78768 U | 5/1986 |
| JP | 2003-534124 A | 11/2003 |

\* cited by examiner

*Primary Examiner* — Gary Graham

(74) *Attorney, Agent, or Firm* — Marsh Fischmann & Breyfogle LLP (57) ABSTRACT

A washer nozzle provided in a wiper blade has a first ejection hole ejecting a first washer fluid, and a second ejection hole ejecting a second washer fluid. A first ejection axis, which is a center line of a first ejection port angle of the first ejection hole, is define. A second ejection axis, which is a center line of a second ejection port angle of the second ejection hole, is defined. The washer nozzle is structured such that the first ejection axis and the second ejection axis intersect with each other as seen from a width direction of the wiper blade.

13 Claims, 6 Drawing Sheets

WIPER BLADE AND VEHICLE WIPER

BACKGROUND OF THE INVENTION

The present invention relates to a wiper blade and a vehicle wiper that are structured so as to wipe a target surface to be wiped of a vehicle windshield and further supply a washer fluid to the target surface.

A vehicle wiper disclosed in Japanese Laid-Open Utility Model Publication No. 54-180541 has a wiper blade wiping dirt on a target surface to be wiped of a vehicle windshield, and a washer device supplying washer fluid to the target surface. In order to properly supply the washer fluid to the target surface, a rigid piping having a plurality of ejection holes is installed to an outer side of a wiper blade in such a manner as to extend along a longitudinal direction of the wiper blade while being party bent. The washer fluid is ejected toward the target surface from the ejection holes. An ejecting direction of the washer fluid from the ejection hole positioned in a bent portion of the piping is directed in the longitudinal direction of the wiper blade.

In recent years, in order to improve the appearance of the vehicle wiper and secure a good driver's visibility, the height of the wiper blade from the target surface tends to be reduced, that is, the distance of the wiper blade from the target surface tends to be set small. However, if the height of the wiper blade of the publication mentioned above is made small, the piping comes close to the target surface, and an interval between the target surface and the ejection hole is reduced. Accordingly, the spread of the washer fluid ejected from each of the ejection holes so as to be received by the target surface is reduced. In this case, in order to supply the washer fluid to the target surface over a wide range in the longitudinal direction of the wiper blade, it is considered to increase the number of the ejection holes, however, this structure causes a complication of the washer fluid. Particularly, since the ejection hole in the center in the longitudinal direction of the piping of the document mentioned above ejects the washer fluid substantially directly downward, the washer fluid ejected from the ejection hole is hard to be spread, and a region of the ejection fluid received by the target surface, that is, a fluid receiving area is hard to be spread. In other words, if the height of the wiper blade is made small, there is a risk of increasing a gap between the fluid receiving area of the washer fluid ejected from the ejection hole in the center in the longitudinal direction of the piping and the fluid receiving area of the washer fluid ejected from the ejection hole in the bent portion, that is. Such a gap is referred to as a fluid non-receiving area.

SUMMARY OF THE INVENTION

An objective of the present invention is to provide a wiper blade and a vehicle wiper which are capable of supplying a washer fluid to a target surface to be wiped over a wide range in a longitudinal direction of the wiper blade while suppressing an increase of the number of ejection holes.

According to one aspect of the invention, a wiper blade for wiping a target surface to be wiped is provided. The wiper blade defines a longitudinal direction and a width direction perpendicular to the longitudinal direction. The wiper blade has a washer nozzle for supplying a washer fluid to the target surface. The washer nozzle has a plurality of ejection holes for ejecting the washer fluid. The washer nozzle is structured in such a manner that the washer fluid ejected from each of the ejection holes spreads in the longitudinal direction. An ejection axis, which is a center line of the expansion, is defined for each of the ejection holes. The washer nozzle is structured such that the ejection axes of at least two the ejection holes intersect with each other as seen from the width direction.

According to another aspect of the invention, a vehicle wiper for wiping a target surface to be wiped is provided. The vehicle wiper includes: a wiper arm rotated in a reciprocating manner; and a wiper blade having a coupling portion coupled to a distal end of the wiper arm to wipe the target surface. The wiper blade defines a longitudinal direction and a width direction perpendicular to the longitudinal direction. A washer nozzle is arranged in the coupling portion to supply washer fluid to the target surface. The washer nozzle has a plurality of ejection holes for ejecting the washer fluid. The washer nozzle is structured such that the washer fluid ejected from the ejection holes spread in the longitudinal direction. An ejection axis, which is a center line of the corresponding expansion, is defined for each ejection hole. The washer nozzle is structured such that the ejection axes of at least two the ejection holes intersect with each other as seen from the width direction.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

FIGS. 1 to 6 show one embodiment according to the present invention.

Figure 1:
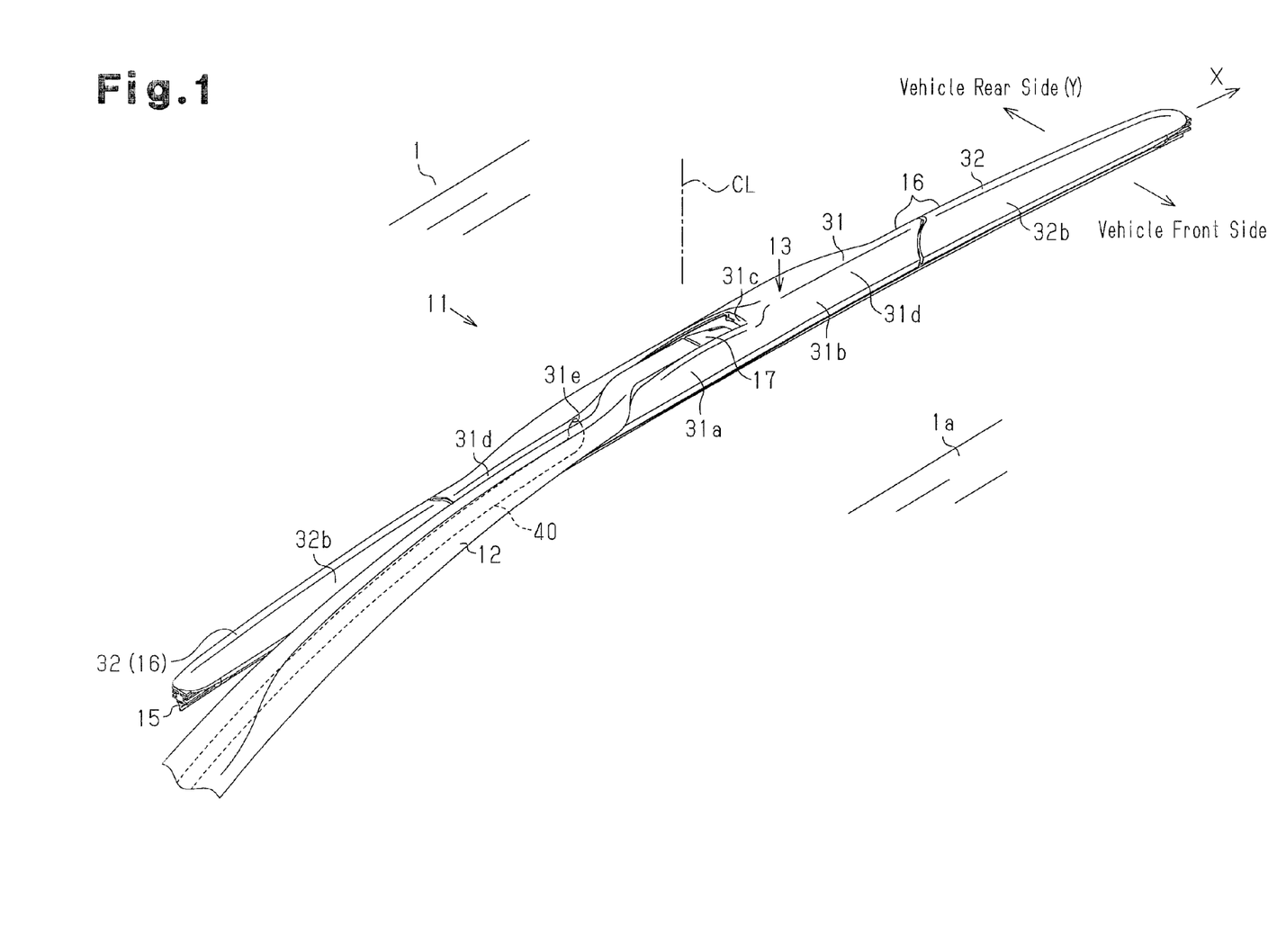
FIG. 1 is a perspective view of a vehicle wiper in accordance with one embodiment according to the present invention.

As shown in FIG. 1, a vehicle wiper 11 in accordance with the embodiment wipes dirt, rain drops on a target surface 1a to be wiped of a windshield of a vehicle.

As shown in FIG. 1, the vehicle wiper 11 is provided with a wiper arm 12, and a wiper blade 13 coupled to the wiper arm 12. The wiper blade 13 defines a longitudinal direction, that is, a direction X, and a width direction perpendicular to the longitudinal direction, that is, a direction Y. FIG. 1 shows the wiper blade 13 positioned at a stop position, the wiper blade 13 at the stop position extends in the width direction of the vehicle, and the width direction Y of the wiper blade 13 corresponds to a longitudinal direction of the vehicle. Further, the wiper blade 13 defines a bisector CL bisecting the wiper blade 13 by passing through a center in the longitudinal direction of the wiper blade 13.

A proximal end of the wiper arm 12 is supported by a pivot shaft (not shown) extending from the vehicle, and the wiper blade 13 is rotatably coupled to a distal end of the wiper arm 12. The pivot shaft is rotated in a reciprocating manner over a predetermined angular range by a wiper motor (not shown). A spring (not shown) pressing the wiper blade 13 against the target surface 1a is installed in the wiper arm 12. The wiper arm 12 is rotated in a reciprocating manner in such a manner as to move in the width direction in accordance with a reciprocating rotation of the pivot shaft, whereby the wiper blade 13 wipes the target surface 1a.

Figure 3:
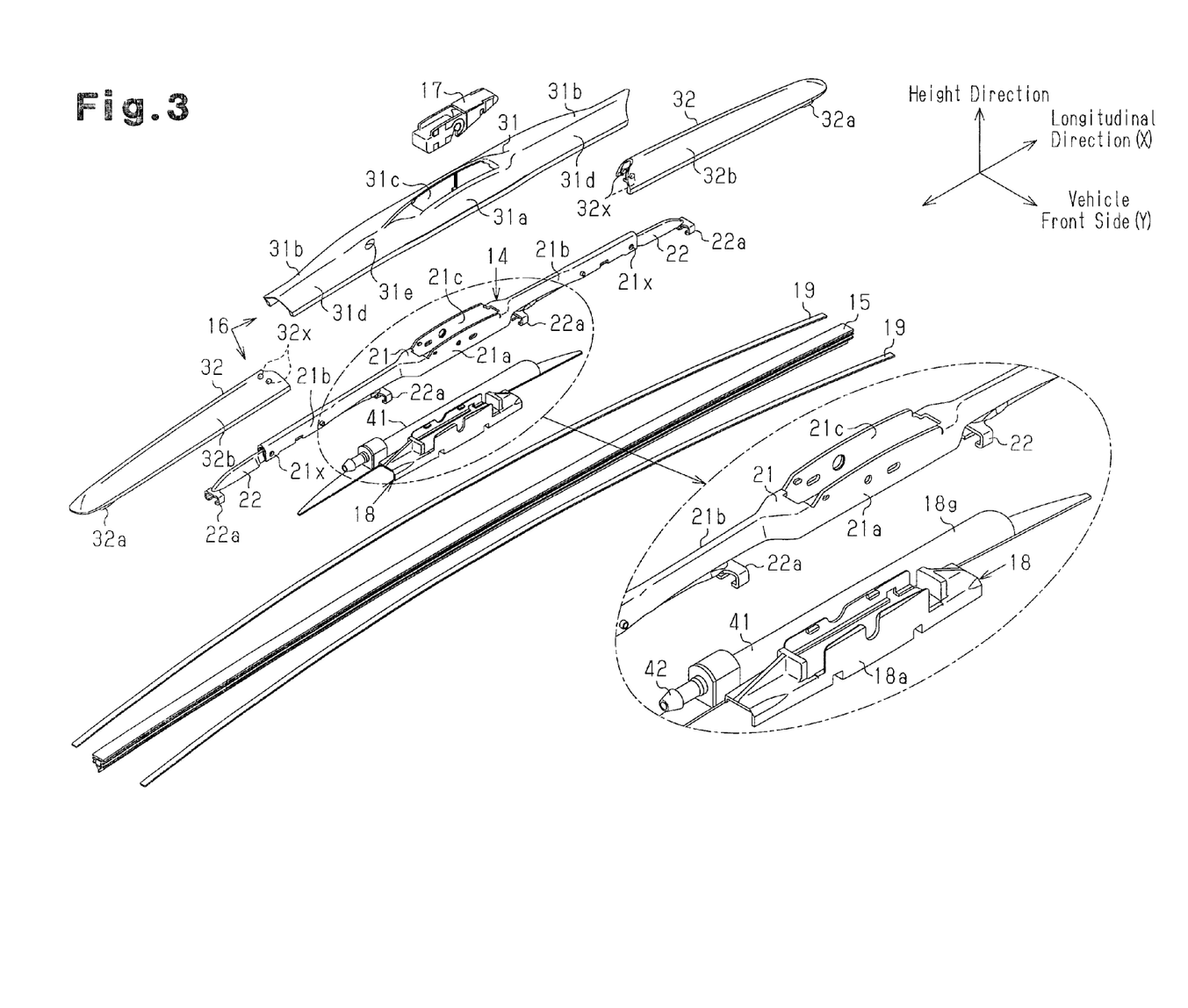
FIG. 3 is an exploded perspective view of the wiper blade in FIG. 2A.

As shown in FIG. 3, the wiper blade 13 includes a lever assembly 14, a blade rubber 15, a cover assembly 16, a coupling member 17, and an attachment plate 18. The coupling member 17 is a coupling portion rotatably coupling the lever assembly 14 to a distal end of the wiper arm 12. The lever assembly 14 holds the blade rubber 15. The cover assembly 16 covers the lever assembly 14 and the blade rubber 15. The attachment plate 18 installs a washer nozzle 41 to the lever assembly 14.

As shown in FIG. 3, the lever assembly 14 includes a primary lever 21 and a pair of secondary levers 22 which are coupled to each other in tournament style, that is, in a hierarchical manner. The secondary levers 22 are respectively coupled rotatably to both ends in a longitudinal direction of the primary lever 21.

As shown in FIG. 3, the primary lever 21 includes a holder 21a positioned at the center in the longitudinal direction, and a pair of arms 21b extending from both ends of the holder 21a. The holder 21a has a pair of parallel flat side walls, and has a rectangular opening 21c in an upper portion. The distal end of the wiper arm 12 is inserted to the opening 21c, and the coupling member 17 is rotatably installed to the holder 21a within the opening 21c. The coupling member 17 is detachable from the distal end of the wiper arm 12. A cross section perpendicular to the longitudinal direction of the arm 21b has a mountain fold shape, and has an approximately U-shaped cross section open toward the target surface 1a.

Each of the secondary levers 22 has the same mountain fold shape as the arm 21b of the primary lever 21. A center in the longitudinal direction of each of the secondary levers 22 is rotatably coupled to a distal end of each of the arms 21b. Both ends in the longitudinal direction of each of the secondary levers 22 have a pair of grip portions 22a for gripping the long blade rubber 15. The grip portion 22a has a pair of pawl portions holding the blade rubber 15. Totally four grip portions 22a are arranged at a predetermined interval.

As shown in FIG. 3, a pair of long backings 19 are installed to the blade rubber 15. If the blade rubber 15 is exposed to the pressing force heading for the target surface 1a from the grip portion 22a, the backing 19 disperses the pressing force in the longitudinal direction of the blade rubber 15. The backing 19 is curved as a whole. The backing 19 has different curvatures per some sections in the longitudinal direction in such a manner as to correspond to the curved surface shape of the target surface 1a. As a result, the blade rubber 15 well follows the target surface 1a in a whole of the target range.

Figure 2A:
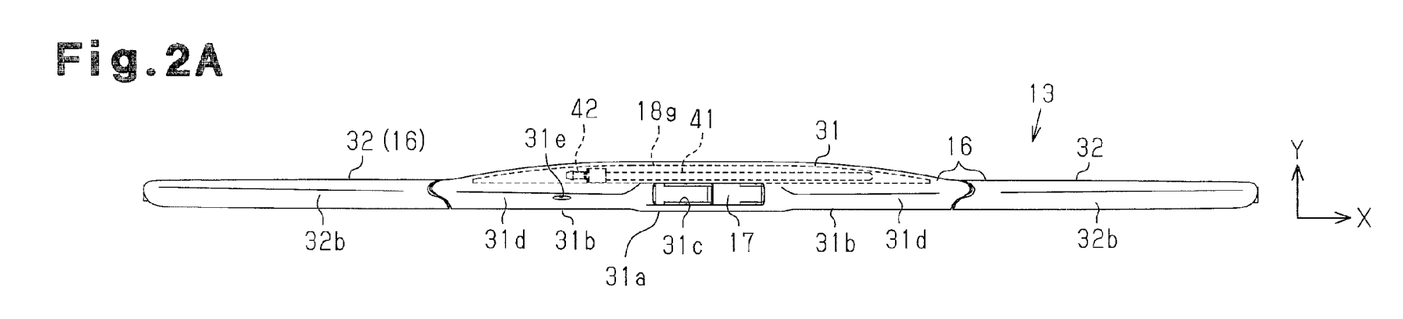
FIG. 2A is a plan view of the wiper blade shown in FIG. 1.
Figure 2B:
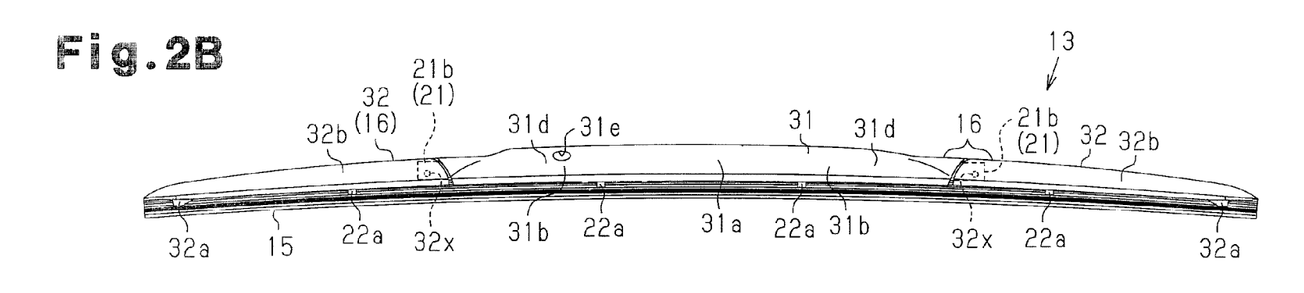
FIG. 2B is a front view of the wiper blade in FIG. 2A.
Figure 2C:
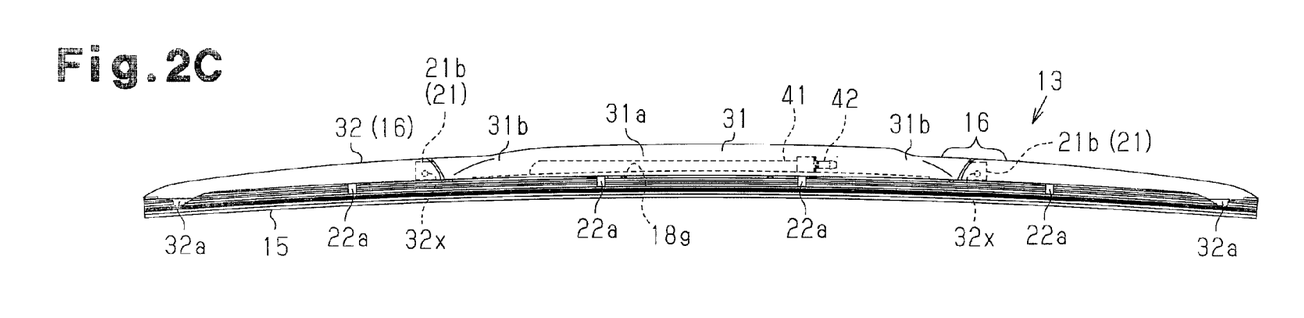
FIG. 2C is a rear view of the wiper blade in FIG. 2A.

As shown in FIGS. 1 to 3, the cover assembly 16 extends to both ends of the blade rubber 15. The cover assembly 16 is provided with a center cover 31, and two side covers 32 arranged in both ends of the center cover 31, and each of the center cover 31 and the side covers 32 is made of a resin and has a predetermined rigidity.

The center cover 31 is installed to the primary lever 21, and covers a whole of the primary lever 21. The center cover 31 includes a holder accommodating portion 31a in the center in the longitudinal direction, and a pair of arm accommodating portions 31b extending in the longitudinal direction from both ends of the holder accommodating portion 31a. The holder accommodating portion 31a accommodates the holder 21a, and has an opening 31c corresponding to the opening 21c of the holder 21a in an upper portion. The distal end of the wiper arm 12 is inserted to the opening 31c. A cross section of the arm accommodating portion 31b has a mountain fold shape, and has a U-shaped cross section open toward the target surface 1a.

A proximal end of the side cover 32 is rotatably installed to each of both ends of the primary lever 21, that is, the distal end of the arm 21b. The proximal end of the side cover 32 accommodates a coupling pin 32x, and both ends of the primary lever 21 have a coupling hole 21x. The coupling pin 32x is coupled to the coupling hole 21x, whereby the side cover 32 is rotatable with respect to the primary lever 21. The side cover 32 has a mountain fold shape in the same manner as the arm accommodating portion 31b, and the height of a top portion of the side cover 32 is gradually reduced toward the distal end from the proximal end of the side cover 32. The side cover 32 covers the secondary lever 22 protruding from both ends of the primary lever 21, and is positioned at an upper portion of the blade rubber 15 in an outer side of the secondary lever 22. The distal end of the side cover 32 has a grip portion 32a gripping an end of the blade rubber 15. A shape of the grip portion 32a is the same as the grip portion 22a of the secondary lever 22. The side cover 32 can be rotated around the coupling pin 32x, that is, a proximal end of the side cover 32, in such a manner as to follow a deflection of a part of the blade rubber 15 protruding outward in the longitudinal direction from each of the secondary lever 22.

A fin 31d is formed in a wall portion in a front side of the arm accommodating portion 31b with respect to the vehicle, and a fin 32b is formed in a wall portion in a front side of each side cover 32 with respect to the vehicle. Each of the fins 31d and 32b generates a pressing force pressing the blade rubber 15 against the target surface 1a by being exposed to relative wind. Each of the fins 31d and 32b extends over the entire the longitudinal direction of the arm accommodating portion 31b and the side cover 32.

As shown in FIGS. 2A and 3, the center cover 31 accommodates the attachment plate 18 made of a resin, and the washer nozzle 41 integrally formed in the attachment plate 18. The attachment plate 18 is installed to the holder 21a from below. The washer nozzle 41 is positioned in an opposite side to the fin 31d. In other words, the washer nozzle 41 is positioned in a rear side of the fin 31d with respect to the vehicle. Further, in other words, the washer nozzle 41 is positioned in an advancing side of the wiper blade 13 with respect to the blade rubber 15, in the case that the wiper blade 13 in a stop state starts wiping.

Figure 4:
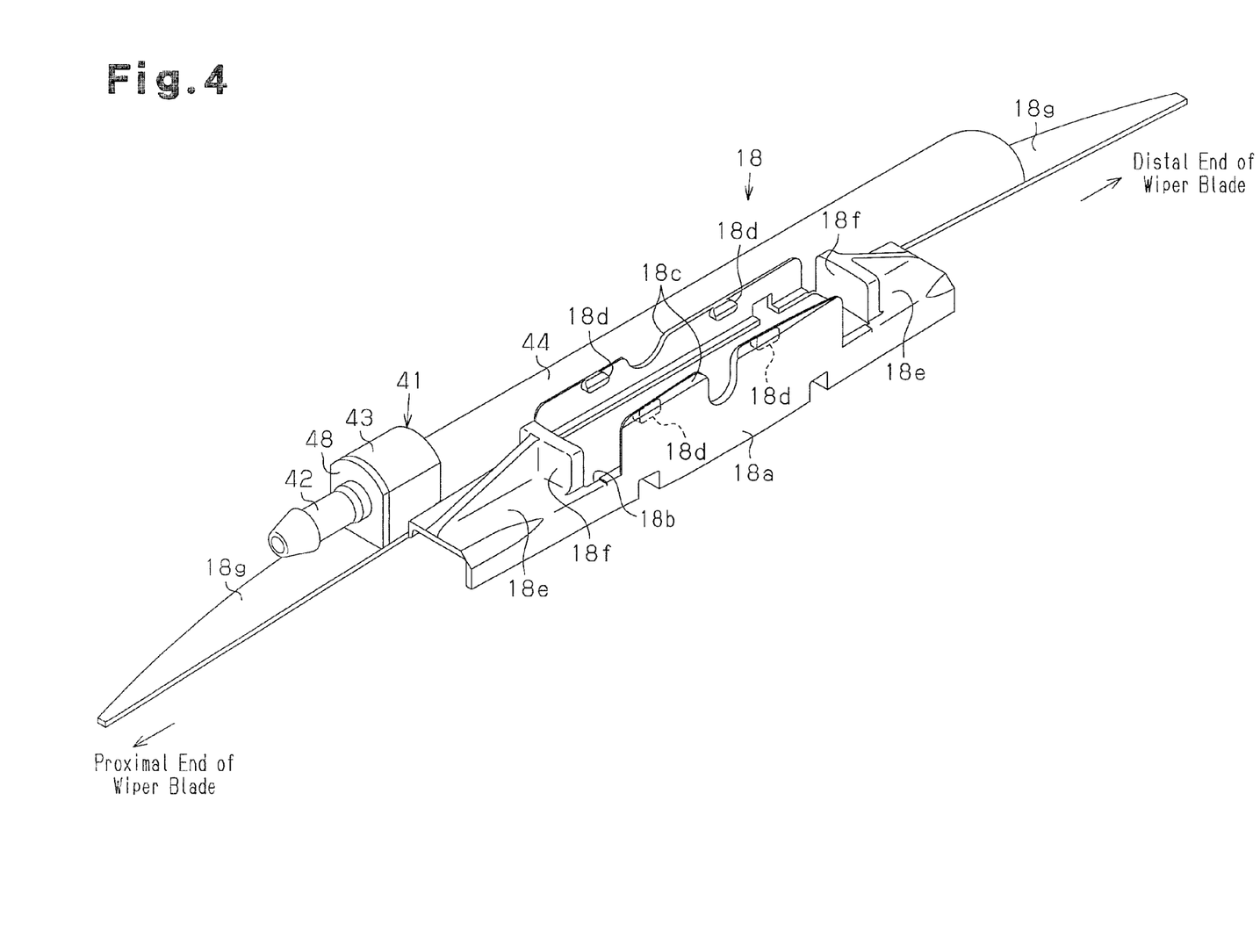
FIG. 4 is a perspective view of a washer nozzle and an attachment plate shown in FIG. 3.

As shown in FIGS. 3 and 4, the attachment plate 18 has a plate main body 18a, and a lid portion 18g positioned in an opposite side to the fin 31d with respect to the plate main body 18a. The washer nozzle 41 is arranged on an upper surface of the lid portion 18g. In other words, since the washer nozzle 41 is accommodated in an accommodating space surrounded by the lid portion 18g and the center cover 31, it can be said that the washer nozzle 41 is arranged in the coupling member 17.

As shown in FIG. 4, the center in the longitudinal direction of the plate main body 18a has a rectangular opening 18b extending in the longitudinal direction X of the wiper blade 13 in correspondence to the opening 21c of the holder 21a. The plate main body 18a has a pair of attachment pieces 18c extending upward from both ends in a width direction of the opening 18b. The holder 21a is accommodated between a pair of attachment pieces 18c. In other words, each of the attachment pieces 18c opposes to an outer surface of a side wall of the holder 21a. Each of opposing inner surfaces of a pair of attachment pieces 18c has two locking projections 18d. The locking projection 18d is retained to an upper end of the holder 21a. Accordingly, the attachment plate 18 can be detachably installed to the holder 21a.

The plate main body 18a has a pair of closing portions 18e positioned in both ends in the longitudinal direction of the opening 18b, and a pair of partitioning walls 18f rising up from the closing portions 18e. Each closing portion 18e closes a lower opening of the holder 21a. Each partitioning wall 18f is inserted to an inner side of the holder 21a, and partitions an inner space of the holder 21a into a section on the side of the opening 21c and a section on the side of the arm 21b. In other words, the closing portions 18e inhibit an air flow at a time when the vehicle travels from entering into both ends in a longitudinal direction of the opening 21c from the lower opening of the holder 21a, and the partitioning walls 18f inhibit the air flow making an intrusion into the opening 21c from entering into the arm 21b. Accordingly, the air flow around the primary lever 21 is smooth, and a wind noise at a time when the vehicle travels can be suppressed.

As shown in FIG. 4, the lid portion 18g extends longer than the plate main body 18a so as to close a gap between the primary lever 21 and the center cover 31. Accordingly, the air flow is inhibited from entering into the gap, and the wind noise is inhibited from being generated at a time when the vehicle travels.

Figure 5:
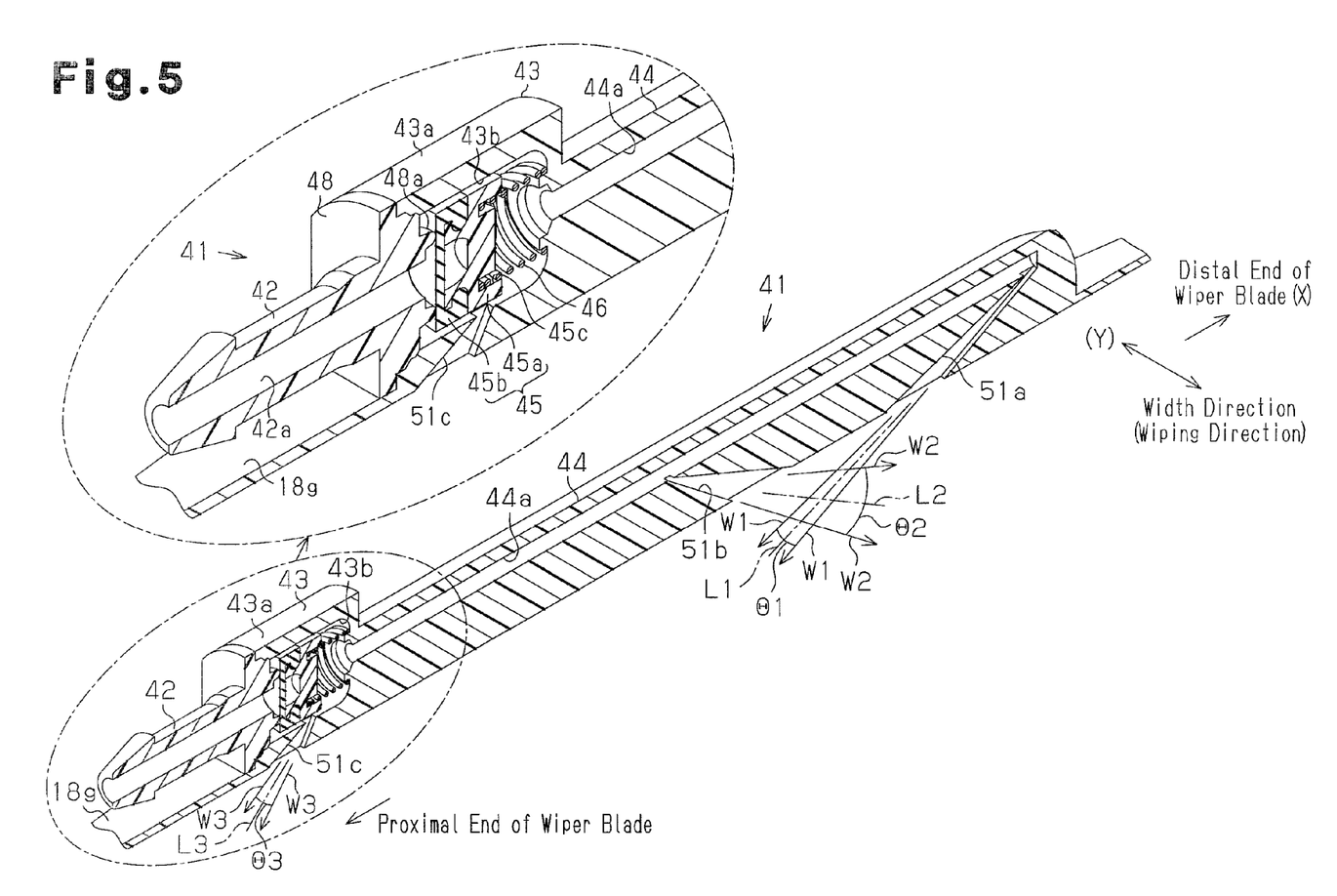
FIG. 5 is a cross sectional view of the washer nozzle in FIG. 4.

As shown in FIGS. 4 and 5, the washer nozzle 41 is provided with a hose connecting portion 42, a check valve 43 and a nozzle portion 44 arranged from the proximal end of the wiper blade 13 toward the distal end. The washer nozzle 41 and the nozzle portion 44 are elongated along the longitudinal direction X of the wiper blade 13.

A vehicle body hose 40 shown in FIG. 1 is connected to the hose connecting portion 42. The vehicle body hose 40 extends from a washer pump (not shown) arranged in a vehicle body. A washer fluid pressure fed from the washer pump is transmitted to the nozzle portion 44 via the check valve 43, and is ejected toward the target surface 1a from the nozzle portion 44. The check valve 43 prevents the washer fluid from backward flowing to the vehicle body hose 40 from the nozzle portion 44 at a time when the washer pump stops.

As shown in FIG. 5, the check valve 43 has a valve case 43a arranged on the lid portion 18g. The valve case 43a is shaped as a cylinder with a bottom lying sideways, and an opening of the valve case 43a is closed by a lid body 48. The nozzle portion 44 is integrally formed in a wall portion in an opposite side to the lid body 48 of the valve case 43a. The nozzle portion 44 extends in the longitudinal direction X of the wiper blade 13 on the lid portion 18g. The valve case 43a has in it an accommodating recess 43b having a circular cross section, and the accommodating recess 43b accommodates a valve body 45 and a coil spring 46. The coil spring 46 urges the valve body 45 in a closing direction of the check valve 43.

As shown in FIG. 5, the valve body 45 has a base portion 45a and a seal portion 45b. The base portion 45a is made of a cylindrical resin, and the seal portion 45b is made of an elastic member such as a disc-like rubber, elastomer or the like. The seal portion 45b is installed to a first end in an axial direction of the base portion 45a. A second end of the base portion 45a has an annular spring attaching groove 45c, and one end of the coil spring 46 is accommodated in the spring attaching groove 45c. The coil spring 46 is arranged between the valve body 45 and a wall portion of the valve case 43a. The outer diameter of the valve body 45 is set smaller than the inner diameter of the accommodating recess 43b, and a periphery of the valve body 45 forms a flow path of the washer fluid.

The lid body 48 is integrally formed with the hose connecting portion 42. The hose connecting portion 42 has a cylindrical shape extending along the longitudinal direction of the washer nozzle 41. The hose connecting portion 42 has in it an introducing passage 42a introducing the washer fluid into the accommodating recess 43b, and the introducing passage 42a is open in a center of an inner surface of the lid body 48.

As shown in FIG. 1, the vehicle body hose 40 is arranged in a lower surface of the wiper arm 12. The vehicle body hose 40 is formed by a resin material or an elastic material such as a rubber, an elastomer or the like. The center cover 31 has an insertion hole 31e positioned near the distal end of the wiper arm 12, and a distal end of the vehicle body hose 40 is inserted into the center cover 31 from the insertion hole 31e, and is fitted to the hose connecting portion 42 within the center cover 31.

As shown in FIG. 5, an inner surface of the lid body 48 has an annular projection 48a surrounding an opening of the introducing passage 42a. The diameter of the annular projection 48a is smaller than the diameter of the valve body 45. A seal portion 45b of the valve body 45 is closely attached to the annular projection 48a on the basis of an urging force of the coil spring 46. In other words, if the valve body 45 closes the introducing passage 42a, a distribution of the washer fluid between the accommodating recess 43b and the introducing passage 42a is blocked. If the pressure of the washer fluid in the introducing passage 42a is increased by an actuation of the washer pump, the valve body 45 is retracted against the urging force of the coil spring 46, the introducing passage 42a is opened. Accordingly, the washer fluid is supplied to the accommodating recess 43b from the introducing passage 42a.

As shown in FIG. 5, the valve case 43a has a communication hole 44a extending in the longitudinal direction so as to communicate with the accommodating recess 43b. A lower surface of the nozzle portion 44, that is, a lower surface of the lid portion 18g has a first ejection hole 51a, a second ejection hole 51b and a third ejection hole 51c. The first ejection hole 51a to the third ejection hole 51c are arranged so as to be spaced from each other in the longitudinal direction of the washer nozzle 41. Each of the first ejection hole 51a to the third ejection hole 51c is formed to linearly extend in the longitudinal direction X of the wiper blade 13. The first ejection hole 51a to the third ejection hole 51c in accordance with the present embodiment are arranged on a straight line extending in the longitudinal direction X of the wiper blade 13.

As shown in FIG. 5, the first ejection hole 51a, the second ejection hole 51b and the third ejection hole 51c are arranged in the order from the distal end of the wiper blade 13 toward the proximal end. In other words, the first ejection hole 51a is arranged in the distal end of the nozzle portion 44, the second ejection hole 51b is arranged in a center in the longitudinal direction of the nozzle portion 44, and the third ejection hole 51c is arranged in a lower side of the check valve 43. The first ejection hole 51a and the second ejection hole 51b communicate with the communication hole 44a, and the third ejection hole 51c communicates with the accommodating recess 43b. The first ejection hole 51a is inclined toward the proximal end of the wiper blade 13 as the distance from the lower side of the nozzle portion 44 decreases. The second ejection hole 51b is inclined toward the distal end of the wiper blade 13 as the distance from the lower side of the nozzle portion 44 decreases. The third ejection hole 51c is inclined toward the proximal end of the wiper blade 13 as the distance from the lower side of the lid portion 18g decreases.

Each of the first ejection hole 51a to the third ejection hole 51c is gradually flared in the longitudinal direction X of the wiper blade 13 in accordance with heading for the lower surface of the nozzle portion 44, for the purpose of diffusion ejecting the washer fluid. In other words, each of the first ejection hole 51a to the third ejection hole 51c is gradually flared in the longitudinal direction X of the wiper blade 13 in accordance with coming close to the opening of each of the holes.

If the washer pump is activated for the purpose of ejecting the washer fluid to the target surface 1a, the washer fluid is supplied to the accommodating recess 43b of the washer nozzle 41 and the communication hole 44a. As a result, as shown in FIG. 5, a first washer fluid W1 to a third washer fluid W3 are respectively ejected from the first ejection hole 51a to the third ejection hole 51c. As a matter of convenience, the washer fluid ejected from the first ejection hole 51a is referred to as the first washer fluid W1, the washer fluid ejected from the second ejection hole 51b is referred to as the second washer fluid W2, and the washer fluid ejected from the third ejection hole 51c is referred to as the third washer fluid W3. Further, a wiping motion of the wiper blade 13 is started working with the operation of the washer pump. As shown in FIG. 1, in a state in which a whole in the longitudinal direction of the blade rubber 15 follows to the target surface 1a, the blade rubber 15 wipes the target surface 1a by which the first washer fluid W1 to the third washer fluid W3 are received.

As shown in FIG. 5, the first washer fluid W1 is ejected toward the proximal end of the wiper blade 13 from the first ejection hole 51a, the second washer fluid W2 is ejected toward the distal end of the wiper blade 13 from the second ejection hole 51b, and the third washer fluid W3 is ejected toward the proximal end of the wiper blade 13 from the third ejection hole 51c. The first washer fluid W1 to the third washer fluid W3 are respectively diffused in accordance with the shapes of the first ejection hole 51a to the third ejection hole 51c. As shown in FIG. 5, two arrows W1 extending downward from the first ejection hole 51a indicate a profile of the first washer fluid W1. In other words, an angle formed by two arrows W1 indicates a first ejection port angle $\Theta 1$, which is an angle of an ejection port of the first ejection hole 51a to the longitudinal direction X of the wiper blade 13. In other words, the first ejection port angle $\Theta 1$ indicates a spreading angle to the longitudinal direction X of the wiper blade 13, in a side wall of the first ejection hole 51a. In other words, it can be said that the first ejection port angle $\Theta 1$ is the spreading angle of the first washer fluid W1.

In the same manner, as shown in FIG. 5, two arrows W2 extending downward from the second ejection hole 51b indicate a profile of the second washer fluid W2, and an angle formed by two arrows W2 indicates a second ejection port angle $\Theta 2$ of the second ejection hole 51b to the longitudinal direction X of the wiper blade 13. In other words, the second ejection port angle $\Theta 2$ indicates a spreading angle to the longitudinal direction X of the wiper blade 13, in a side wall of the second ejection hole 51b. In other words, it can be said that the second ejection port angle $\Theta 2$ is the spreading angle of the second washer fluid W2.

In the same manner, two arrows W3 extending downward from the third ejection hole 51c indicate a profile of the third washer fluid W3, and an angle formed by two arrows W3 indicates a third ejection port angle $\Theta 3$ of the third ejection hole 51c to the longitudinal direction X of the wiper blade 13. In other words, the third ejection port angle $\Theta 3$ indicates a spreading angle to the longitudinal direction X of the wiper blade 13, in a side wall of the third ejection hole 51c. In other words, it can be said that the third ejection port angle $\Theta 3$ is the spreading angle of the third washer fluid W3.

FIG. 5 further shows a first ejection axis L1, which is a center line of the first ejection port angle $\Theta 1$, a second ejection axis L2, which is a center line of the second ejection port angle $\Theta 2$, and a third ejection axis L3, which is a center line of the third ejection port angle $\Theta 3$. In other words, the first ejection axis L1 is a center line of the expansion of the first washer fluid W1 to the longitudinal direction X of the wiper blade 13, the second ejection axis L2 is a center line of the expansion of the second washer fluid W2 to the longitudinal direction X of the wiper blade 13, and the third ejection axis L3 is a center line of the expansion of the third washer fluid W3 to the longitudinal direction X of the wiper blade 13. The first ejection axis L1 to the third ejection axis L3 respectively indicate ejecting directions of the first washer fluid W1 to the third washer fluid W3.

Figure 6:
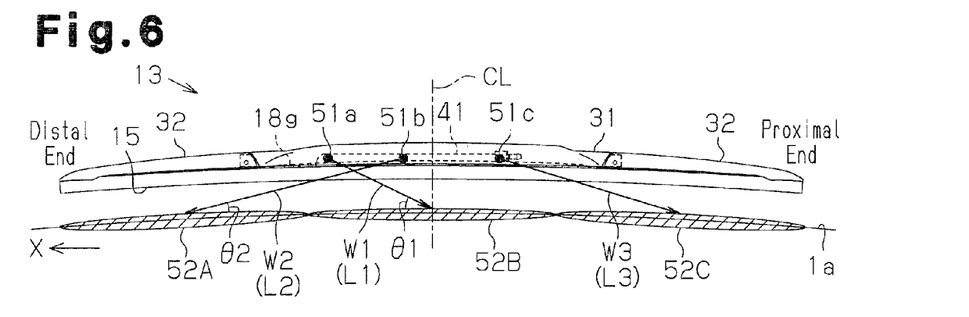
FIG. 6 is a front view showing washer fluid ejection from the washer nozzle in FIG. 5.

As shown in FIGS. 5 and 6, the first ejection axis L1 and the second ejection axis L2 are set such as to intersect with each other as seen from the width direction Y of the wiper blade 13, that is, the wiping direction of the wiper blade 13. In other words, the first ejection axis L1 and the second ejection axis L2 are set such that they cross without coming into contact with each other, that is, satisfy a torsional relation, as seen from the width direction Y of the wiper blade 13. In other words, the first ejection axis L1 and the second ejection axis L2 intersect with each other as seen from a direction perpendicular to the paper surface in FIG. 6. In the present embodiment, the first ejection axis L1 and the second ejection axis L2 are set such that they do not interfere with each other so as to form a twisted state. In other words, in the present embodiment, the first ejection axis L1 and the second ejection axis L2 are set so as to be slightly shifted in the width direction Y of the wiper blade 13, in such a manner as to prevent an ejection track of the first washer fluid W1 and an ejection track of the second washer fluid W2 from being interfered with each other.

Although FIG. 6 shows the blade rubber 15 in a state of being spaced from the target surface 1a so as to clearly show the ejections of the first washer fluid W1 to the third washer fluid W3, the first washer fluid W1 to the third washer fluid W3 are actually ejected in a state in which the blade rubber 15 comes into contact with the target surface 1a. In order to prevent FIG. 6 from being complicated, an illustration of the backing 19 is omitted.

FIG. 6 shows a first fluid receiving area 52A, a second fluid receiving area 52B and a third fluid receiving area 52C which are arranged in the order from the distal end of the wiper blade 13 toward the proximal end. In other words, the first fluid receiving area 52A is positioned below the distal end of the wiper blade 13, the second fluid receiving area 52B is positioned below the center in the longitudinal direction of the wiper blade 13, and the third fluid receiving area 52C is positioned below the proximal end of the wiper blade 13.

The first fluid receiving area 52A in accordance with the present embodiment is a region on the target surface 1a by which the second washer fluid W2 is received. The second fluid receiving area 52B is a region on the target surface 1a by which the first washer fluid W1 is received. The third fluid receiving area 52C is a region on the target surface 1a by which the third washer fluid W3 is received.

The positions of the first ejection hole 51a to the third ejection hole 51c and the ejecting directions of the first washer fluid W1 to the third washer fluid W3 are set in such a manner that the first fluid receiving area 52A to the third fluid receiving area 52C are continuously connected in the longitudinal direction X of the wiper blade 13. In the present embodiment, the first ejection axis L1 and the second ejection axis L2 are set so as to be slightly shifted in the width direction Y of the wiper blade 13, whereby the first fluid receiving area 52A and the second fluid receiving area 52B are slightly shifted in the width direction Y of the wiper blade 13. Each of the first fluid receiving area 52A to the third fluid receiving area 52C is formed to extend linearly in the longitudinal direction of the wiper blade 13.

FIG. 6 shows a first entry angle θ1, which is an entry angle of the first ejection axis L1 with respect to the target surface 1a, and a second entry angle θ2, which is an entry angle of the second ejection axis L2 with respect to the target surface 1a. In the present embodiment, the first entry angle θ1 indicates an angle formed by the target surface 1a and the first ejection axis L1, and the second entry angle θ2 indicates an angle formed by the target surface 1a and the second ejection axis L2.

Since the first ejection axis L1 and the second ejection axis L2 intersect with each other in the present embodiment, each of the first entry angle θ1 and the second entry angle θ2 is small in comparison with the case that the first ejection axis L1 and the second ejection axis L2 do not intersect. Accordingly, each of the distance from the first ejection hole 51a to the target surface 1a, and the distance from the second ejection hole 51b to the target surface 1a is increased. As a result, the first fluid receiving area 52A and the second fluid receiving area 52B spread in the longitudinal direction X of the wiper blade 13.

The present embodiment has the following advantages.

(1) The first ejection axis L1 of the first washer fluid W1 ejected from the first ejection hole 51a, and the second ejection axis L2 of the first washer fluid W1 ejected from the second ejection hole 51b are set in such a manner as to intersect with each other as seen from the width direction Y of the wiper blade 13. In other words, the first ejection axis L1, which is the center line of the first ejection port angle Θ1, and the second ejection axis L2, which is the center line of the second ejection port angle Θ2, are set in such a manner as to intersect with each other as seen from the width direction Y of the wiper blade 13. Accordingly, for example, in comparison with the case that the first ejection axis L1 and the second ejection axis L2 do not intersect, the distance from the first ejection hole 51a to the second fluid receiving area 52B and the distance from the second ejection hole 51b to the first fluid receiving area 52A are large in the present embodiment, and the first washer fluid W1 and the second washer fluid W2 are reliably spread until reaching the target surface 1a.

The first washer fluid W1 and the second washer fluid W2 keeps on spreading in the ejecting direction, that is, the longitudinal direction X of the wiper blade 13 by the force of the ejection until being received by the target surface 1a, even after being received by the target surface 1a. Accordingly, the first fluid receiving area 52A and the second fluid receiving area 52B spread in the longitudinal direction X of the wiper blade 13. In other words, the fluid receiving area per one ejection hole is sufficiently spread. Accordingly, it is possible to supply the first washer fluid W1 to the third washer fluid W3 to the wide range in the longitudinal direction of the wiper blade 13 on the target surface 1a while reducing the number of the ejection holes provided in the washer nozzle 41.

(2) Each of the first entry angle θ1 of the first ejection axis L1, and the second entry angle θ2 of the second ejection axis L2 is set in such a manner as to be within a range between 5 and 60 degrees. The installed positions and the ejecting directions of the first ejection hole 51a and the second ejection hole 51b are set as mentioned above. Accordingly, it is possible to securely enlarge the first fluid receiving area 52A and the second fluid receiving area 52B in the longitudinal direction X of the wiper blade 13. As the first entry angle θ1 is reduced, the second fluid receiving area 52B spreads in the longitudinal direction of the wiper blade 13. In the same manner, as the second entry angle θ2 is reduced, the first fluid receiving area 52A spreads in the longitudinal direction X of the wiper blade 13.

(3) The first fluid receiving area 52A to the third fluid receiving area 52C are set in such a manner as to be continuously connected in the longitudinal direction X of the wiper blade 13. Accordingly, it is possible to suppress unevenness of the fluid reception of the first washer fluid W1 to the third washer fluid W3 to the target surface 1a over the longitudinal direction X of the wiper blade 13. Accordingly, the first washer fluid W1 to the third washer fluid W3 are reliably supplied to the target surface 1a.

(4) The first fluid receiving area 52A to the third fluid receiving area 52C are set so as to be symmetrical with respect to the bisector CL of the wiper blade 13. Accordingly, it is possible to further suppress the unevenness of the fluid reception on the target surface 1a of the first washer fluid W1 to the third washer fluid W3.

(5) Each of the first ejection hole 51a to the third ejection hole 51c is arranged in such a manner as to extend along the straight line extending in the longitudinal direction X of the wiper blade 13. Accordingly, it is possible to easily form each of the first ejection hole 51a to the third ejection hole 51c.

The embodiment mentioned above may be modified as follows.

One of the first ejection hole 51a to the third ejection hole 51c may be deleted, or the number of the ejection holes may be increased.

The number of the washer nozzle 41 is not limited to one, but may be set to a plural number.

The structure is not limited to the structure in which only the first ejection axis L1 and the second ejection axis L2 intersect with each other as seen from the width direction Y of the wiper blade 13. All of the first ejection axis L1, the second ejection axis L2, and the third ejection axis L3 may intersect.

Figure 7:
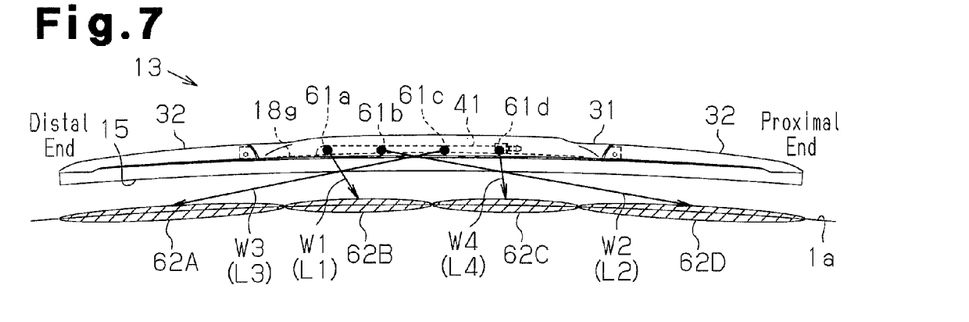
FIG. 7 is a front view showing washer fluid ejection from a washer nozzle in accordance with anther embodiment.
Figure 8:
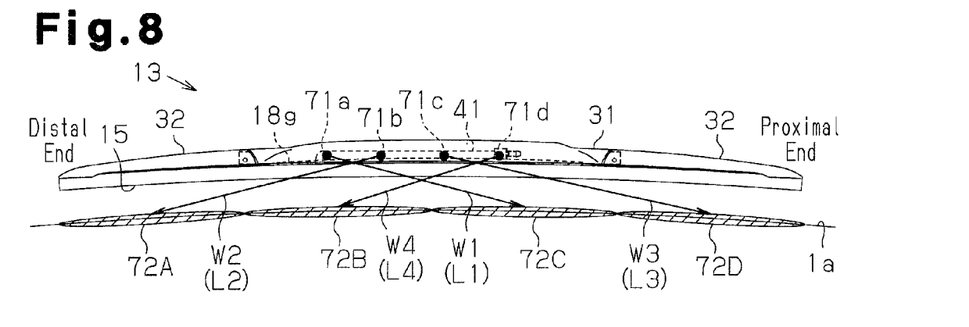
FIG. 8 is a front view showing washer fluid ejection from a washer nozzle in accordance with another embodiment.
Figure 9:
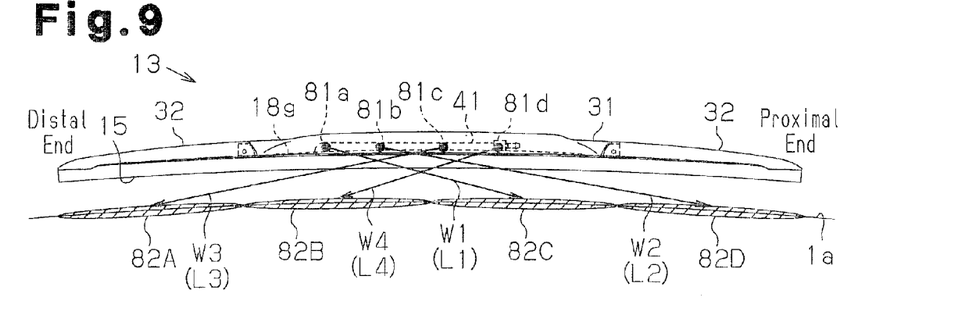
FIG. 9 is a front view showing a washer fluid ejection from a washer nozzle in accordance with another embodiment.

As shown in FIGS. 7 to 9, a first ejection hole 61a to a fourth ejection hole 61d may be formed. In other words, modified embodiments in FIGS. 7 to 9 show variations of combinations of intersection of the first ejection axis L1 to the fourth ejection axis L4.

In the modified embodiment shown in FIG. 7, the first ejection hole 61a, the second ejection hole 61b, the third ejection hole 61c and the fourth ejection hole 61d are arranged in the order from the distal end of the wiper blade 13 toward the proximal end, and a first fluid receiving area 62A, a second fluid receiving area 62B, a third fluid receiving area 62C, and a fourth fluid receiving area 62D are arranged in the order. The first ejection hole 61a corresponds to the second fluid receiving area 62B, the second ejection hole 62b corresponds to the fourth fluid receiving area 62D, the third ejection hole 61c corresponds to the first fluid receiving area 62A, and the fourth ejection hole 61d corresponds to the third fluid receiving area 62C.

In other words, in the case of FIG. 7, the first ejection axis L1 and the third ejection axis L3 respectively extending from the first ejection hole 61a and the third ejection hole 61c sandwiching the second ejection hole 62b intersect with each other as seen from the width direction Y of the wiper blade 13, whereby the second fluid receiving area 62B and the first fluid receiving area 62A which are adjacent to each other are formed. Further, the second ejection axis L2 and the fourth ejection axis L4 respectively extending from the second ejection hole 61b and the fourth ejection hole 61d sandwiching the third ejection hole 62c intersect with each other as seen from the width direction Y of the wiper blade 13, whereby the fourth fluid receiving area 62D and the third fluid receiving area 62C which are adjacent to each other are formed. The second ejection axis L2 also intersects with the third ejection axis L3.

Further, in a modified embodiment shown in FIG. 8, a first ejection hole 71a, a second ejection hole 71b, a third ejection hole 71c, and a fourth ejection hole 71d are arranged in the order from the distal end of the wiper blade 13 toward the proximal end, and a first fluid receiving area 72A, a second fluid receiving area 72B, a third fluid receiving area 72C, and a fourth fluid receiving area 72D are also arranged in the order.

In the case of FIG. 8, the first ejection hole 71a corresponds to the third fluid receiving area 72C, the second ejection hole 72b corresponds to the first fluid receiving area 72A, the third ejection hole 71c corresponds to the fourth fluid receiving area 72D, and the fourth ejection hole 71d corresponds to the second fluid receiving area 72B.

In other words, in the case of FIG. 8, the first ejection axis L1 and the second ejection axis L2 respectively extending from the first ejection hole 71a and the second ejection hole 71b, which are adjacent to each other, intersect with each other as seen from the width direction Y of the wiper blade 13, whereby the third fluid receiving area 72C and the first fluid receiving area 72A sandwiching the second fluid receiving area 72B are formed. Further, the third ejection axis L3 and the fourth ejection axis L4 respectively extending from the third ejection hole 71c and the fourth ejection hole 71d, which are adjacent to each other, intersect with each other as seen from the width direction Y of the wiper blade 13, whereby the fourth fluid receiving area 72D and the second fluid receiving area 72B sandwiching the third fluid receiving area 72C are formed. The first ejection axis L1 also intersects with the fourth ejection axis L4.

Further, in a modified embodiment shown in FIG. 9, a first ejection hole 81a, a second ejection hole 81b, a third ejection hole 81c, and a fourth ejection hole 81d are arranged in the order from the distal end of the wiper blade 13 toward the proximal end, and a first fluid receiving area 82A, a second fluid receiving area 82B, a third fluid receiving area 82C, and a fourth fluid receiving area 82D are also arranged in the order.

In the case of FIG. 9, the first ejection hole 81a corresponds to the third fluid receiving area 82C, the second ejection hole 82b corresponds to the fourth fluid receiving area 82D, the third ejection hole 81c corresponds to the first fluid receiving area 82A, and the fourth ejection hole 81d corresponds to the second fluid receiving area 82B.

In other words, in the case of FIG. 9, the first ejection axis L1 and the third ejection axis L3 respectively extending from the first ejection hole 81a and the third ejection hole 81c sandwiching the second ejection hole 81b intersect with each other as seen from the width direction Y of the wiper blade 13, whereby the third fluid receiving area 82C and the first fluid receiving area 82A sandwiching the second fluid receiving area 82B are formed. Further, the second ejection axis L2 and the fourth ejection axis L4 respectively extending from the second ejection hole 81b and the fourth ejection hole 81d sandwiching the third ejection hole 81c intersect with each other as seen from the width direction Y of the wiper blade 13, whereby the fourth fluid receiving area 82D and the second fluid receiving area 82B sandwiching the third fluid receiving area 82C are formed. The first ejection axis L1 also intersects with the fourth ejection axis L4, and the second ejection axis L2 also intersects with the third ejection axis L3.

The first ejection hole 51a to the third ejection hole 51c in FIG. 6 are not limited to be arranged on the straight line extending in the longitudinal direction X of the wiper blade 13, but may be arranged so as to be shifted with each other in the width direction Y of the wiper blade 13.

The first fluid receiving area 52A to the third fluid receiving area 52C in FIG. 6 are not limited to be slightly shifted in the width direction Y of the wiper blade 13, but may be arranged on a straight line. In this case, it is possible to suppress the unevenness of the fluid reception of the first washer fluid W1 to the third washer fluid W3 to the target surface 1a, over the wiping direction.

The first fluid receiving area 52A to the third fluid receiving area 52C in FIG. 6 do not need to be set to be line symmetrical with respect to the bisector CL of the wiper blade 13.

The first fluid receiving area 52A to the third fluid receiving area 52C in FIG. 6 may be partly overlapped with each other. Further, the first fluid receiving area 52A to the third fluid receiving area 52C are not limited to be continuously connected with respect to the longitudinal direction X of the wiper blade 13, but a small gap may be formed between the first fluid receiving area 52A and the second fluid receiving area 52B, and between the second fluid receiving area 52B and the third fluid receiving area 52C.

The check valve 43 may be deleted from the washer nozzle 41.

The washer nozzle 41 may be arranged outside of the cover assembly 16 in place of inside of the cover assembly 16.

What is claimed is:

1. A wiper blade for wiping a target surface to be wiped, wherein the wiper blade defines a longitudinal direction and a width direction perpendicular to the longitudinal direction,
    wherein the wiper blade has a washer nozzle for supplying a washer fluid to the target surface, and the washer nozzle has a plurality of ejection holes for ejecting the washer fluid, and
    wherein the washer nozzle is structured in such a manner that the washer fluid ejected from each of the ejection holes expands in the longitudinal direction, an ejection axis, which is a center line of the expansion of the washer fluid in the longitudinal direction, is defined for each of the ejection holes, and the washer nozzle is structured such that the ejection axes of at least two of the ejection holes intersect with each other as seen from the width direction.

2. The wiper blade according to claim 1, wherein the washer nozzle is structured such that entry angles of the ejection axes with respect to the target surface are in a range between 5 degrees and 60 degrees.

3. The wiper blade according to claim 1, wherein fluid receiving areas, which are regions on which the washer fluid ejected from the ejection holes is received, are defined on the target surface, and
    wherein the washer nozzle is structured such that the fluid receiving areas are continuously connected in the longitudinal direction.

4. The wiper blade according to claim 1, wherein fluid receiving areas, which are regions on which the washer fluid ejected from the ejection holes is received, are defined on the target surface,
   wherein the wiper blade defines a bisector passing through a center in the longitudinal direction, and
   wherein the washer nozzle is structured such that the fluid receiving areas are symmetrical with respect to the bisector.

5. The wiper blade according to claim 1, wherein fluid receiving areas, which are regions on which the washer fluid ejected from the ejection holes is received, are defined on the target surface, and
   wherein the washer nozzle is structured such that the fluid receiving areas extend along a straight line extending in the longitudinal direction.

6. The wiper blade according to claim 1, wherein the ejection holes are arranged so as to extend along a straight line extending in the longitudinal direction.

7. A vehicle wiper for wiping a target surface to be wiped, the vehicle wiper comprising:
   a wiper arm rotated in a reciprocating manner;
   a wiper blade having a coupling portion coupled to a distal end of the wiper arm to wipe the target surface, wherein the wiper blade defines a longitudinal direction and a width direction perpendicular to the longitudinal direction; and
   a washer nozzle arranged in the coupling portion to supply washer fluid to the target surface, the washer nozzle having a plurality of ejection holes for ejecting the washer fluid, the washer nozzle being structured such that the washer fluid ejected from the ejection holes expand in the longitudinal direction, an ejection axis, which is a center line of the corresponding expansion of the washer fluid in the longitudinal direction, is defined for each ejection hole, and the washer nozzle being structured such that the ejection axes of at least two of the ejection holes intersect with each other as seen from the width direction.

8. The vehicle wiper according to claim 7, wherein the washer nozzle is structured such that entry angles of the ejection axes with respect to the target surface are in a range between 5 degrees and 60 degrees.

9. The vehicle wiper according to claim 7, wherein fluid receiving areas, which are regions on which the washer fluid ejected from the ejection holes is received, are defined on the target surface, and
   wherein the washer nozzle is structured such that a plurality of fluid receiving areas are continuously connected in the longitudinal direction.

10. The vehicle wiper according to claim 7, wherein fluid receiving areas, which are regions on which the washer fluid ejected from the ejection holes is received, are defined on the target surface,
    wherein the wiper blade defines a bisector passing through a center in the longitudinal direction, and
    wherein the washer nozzle is structured such that the fluid receiving areas are symmetrical with respect to the bisector.

11. The vehicle wiper according to claim 7, wherein fluid receiving areas, which are regions on which the washer fluid ejected from the ejection holes is received, are defined on the target surface, and
    wherein the washer nozzle is structured such that the fluid receiving areas extend along a straight line extending in the longitudinal direction.

12. The vehicle wiper according to claim 7, wherein the ejection holes are arranged so as to extend along a straight line extending in the longitudinal direction.

13. A wiper blade for wiping a target surface to be wiped, wherein the wiper blade defines a longitudinal direction and a width direction perpendicular to the longitudinal direction,
    wherein the wiper blade has a washer nozzle for supplying a washer fluid to the target surface, and the washer nozzle has a plurality of ejection holes for ejecting the washer fluid, and
    wherein the washer nozzle is structured in such a manner that ejection port angles of the ejection holes with respect to the longitudinal direction are defined, an ejection axis, which is a center line of the corresponding ejection port angle, is defined for each ejection hole, and the ejection axes of at least two of the ejection holes intersect with each other as seen from the width direction and further, to prevent an ejection track of washer fluid ejected from one of the ejection holes and another ejection track of washer fluid ejected from another of ejection holes from being interfered with each other.

* * * * *